Nov. 24, 1925.                                                            1,562,572
                              S. B. McMURRAIN
              BOMB OR TORPEDO RELEASE CONTROL MECHANISM FOR AIRPLANES
                       Filed April 24, 1925      7 Sheets-Sheet 2
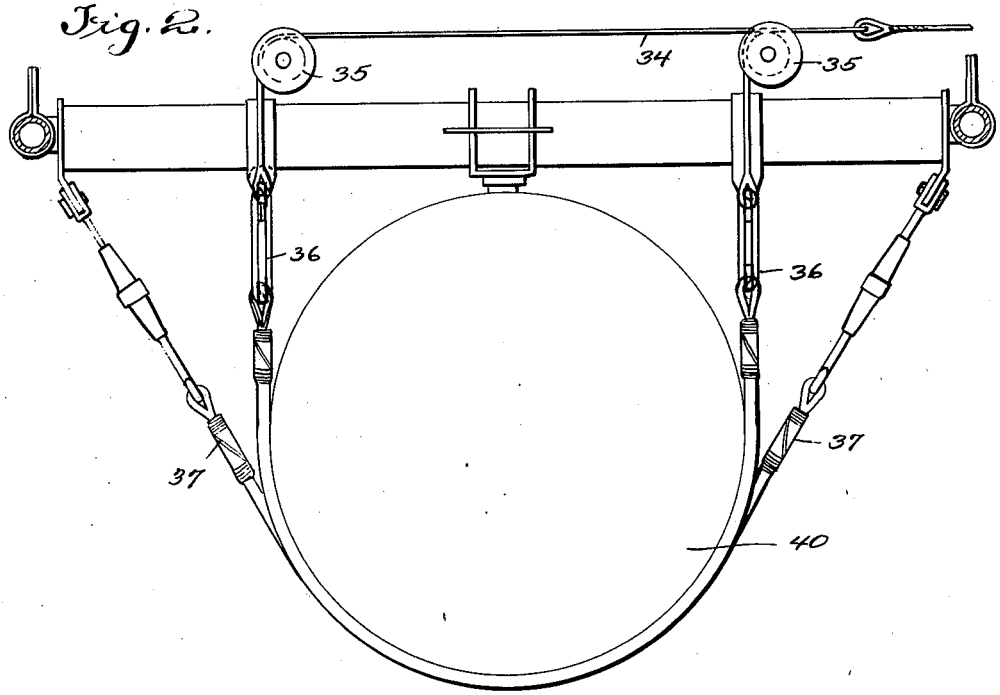
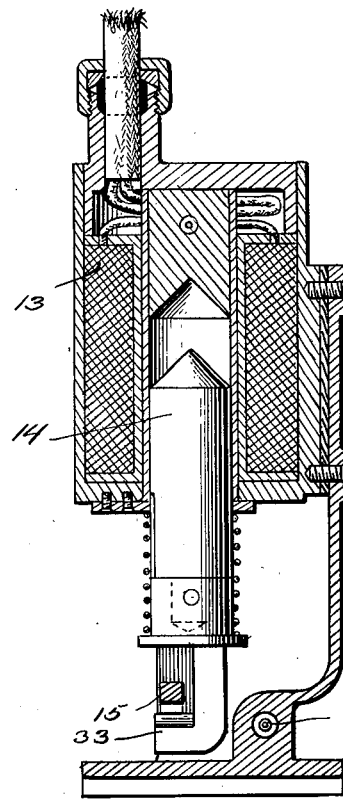
Inventor
S. B. McMurrain
Attorney

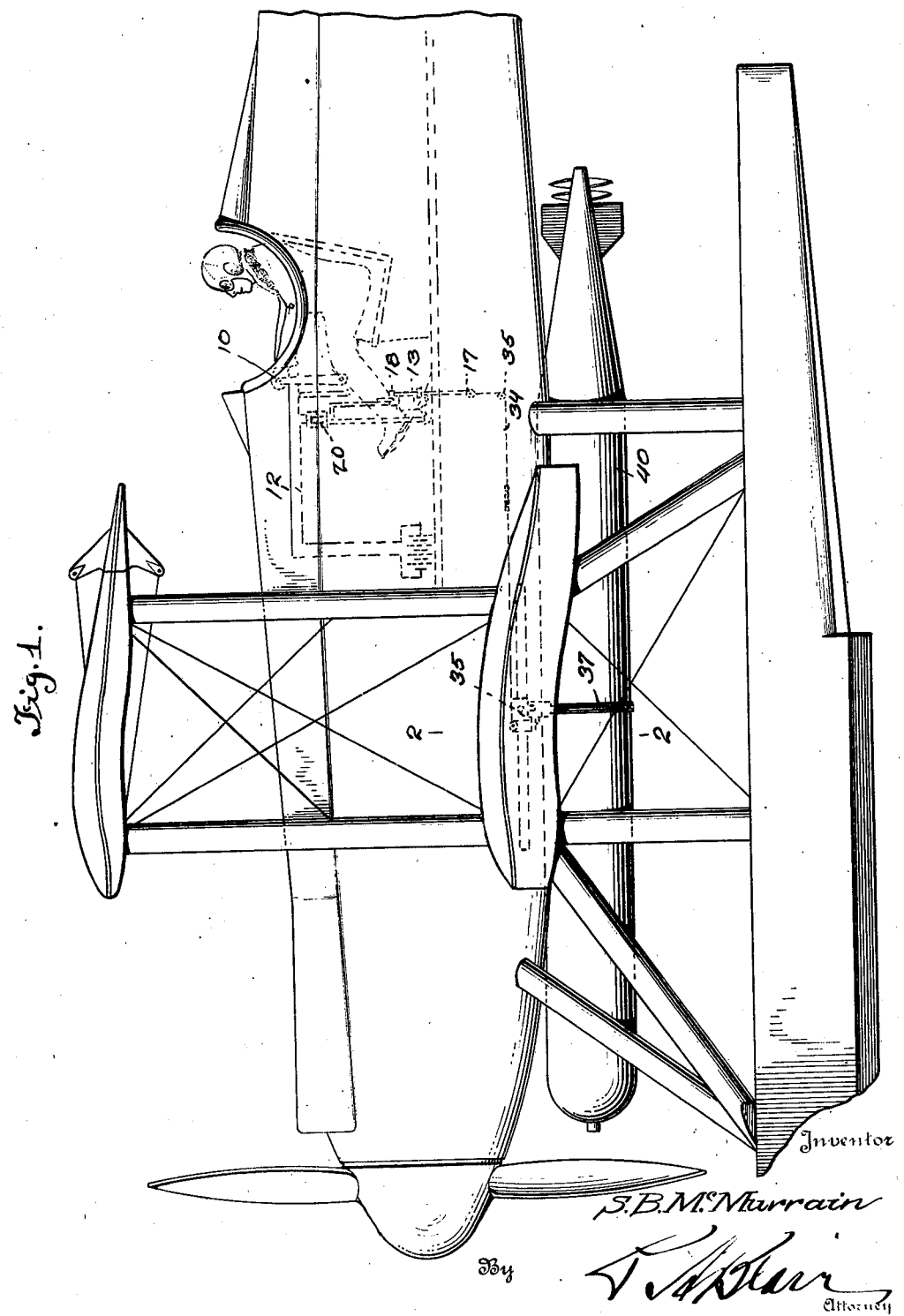

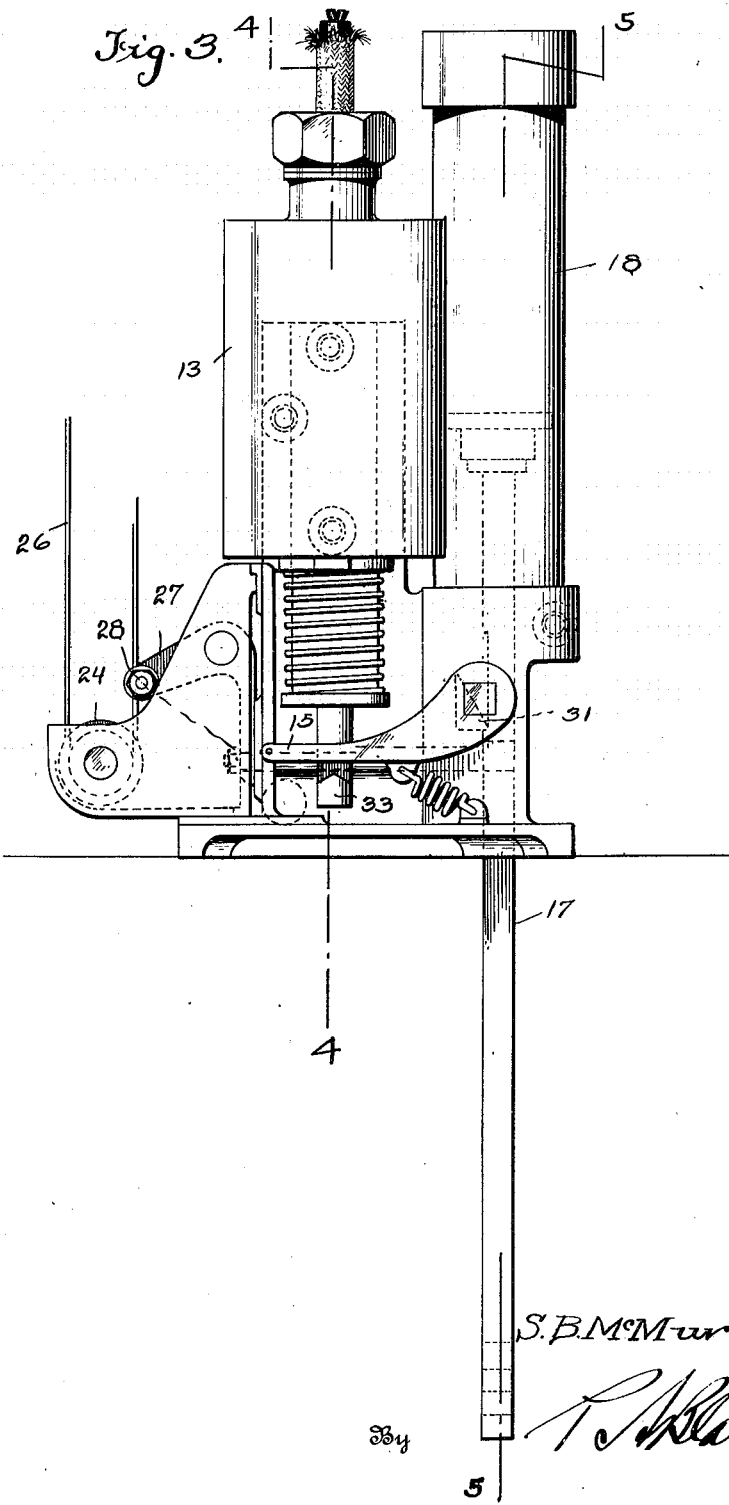

Nov. 24, 1925.
S. B. McMURRAIN
1,562,572
BOMB OR TORPEDO RELEASE CONTROL MECHANISM FOR AIRPLANES
Filed April 24, 1925    7 Sheets-Sheet 4
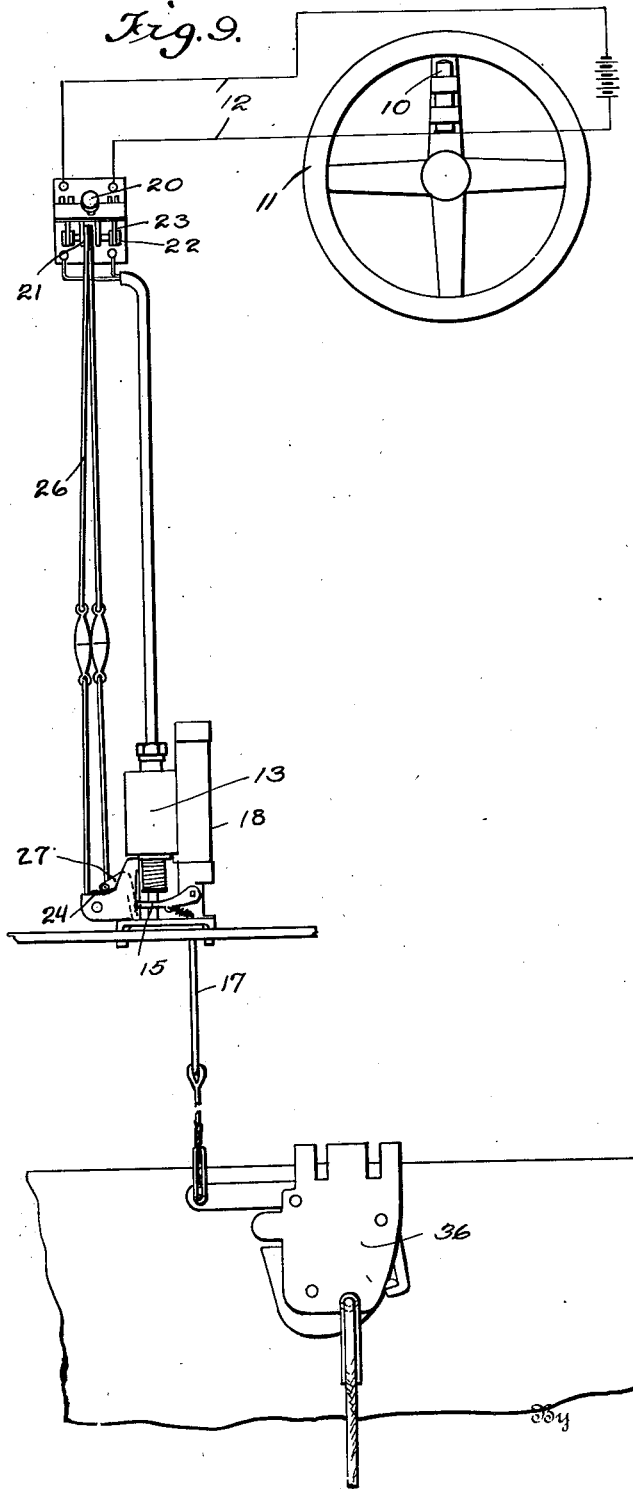
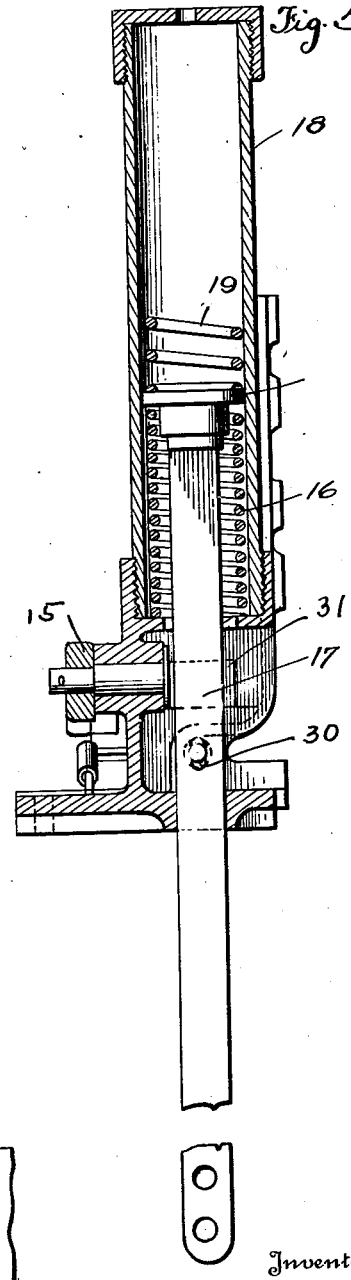
Inventor
S. B. McMurrain
Attorney

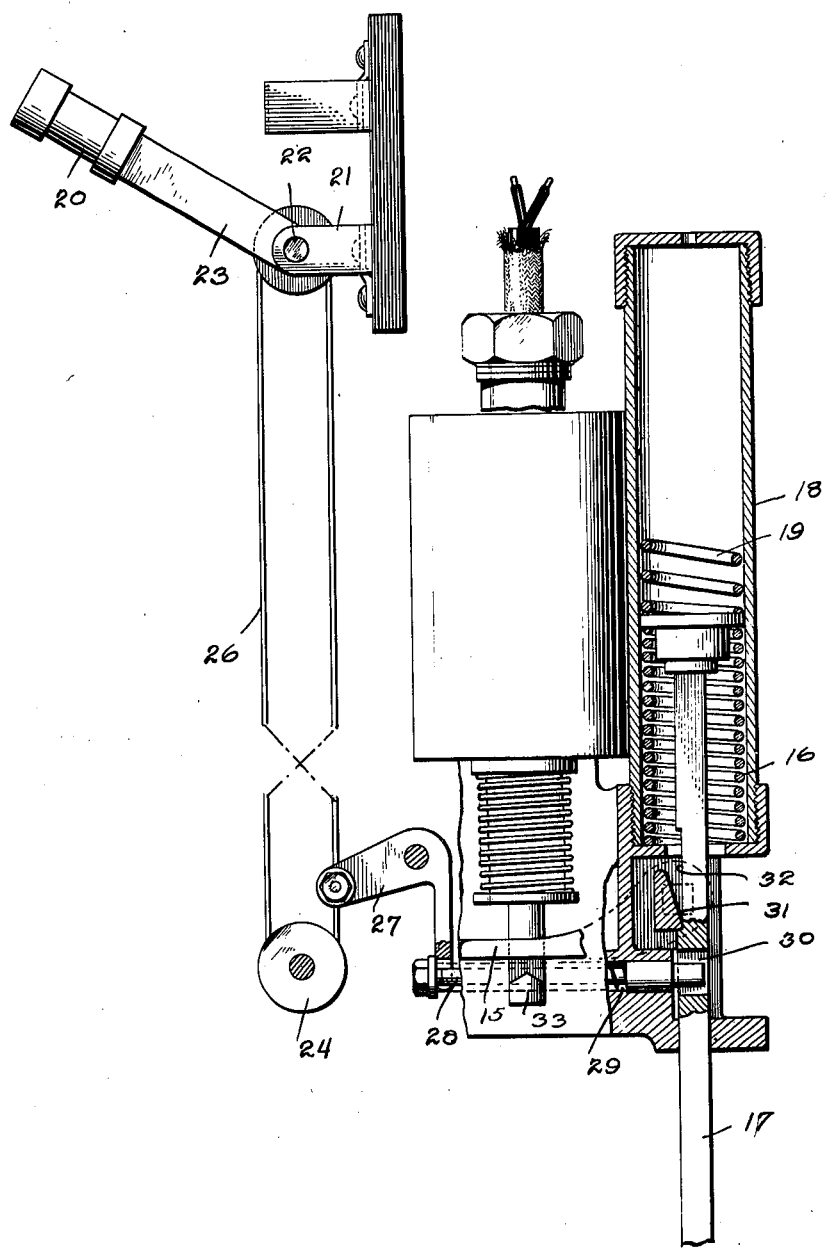

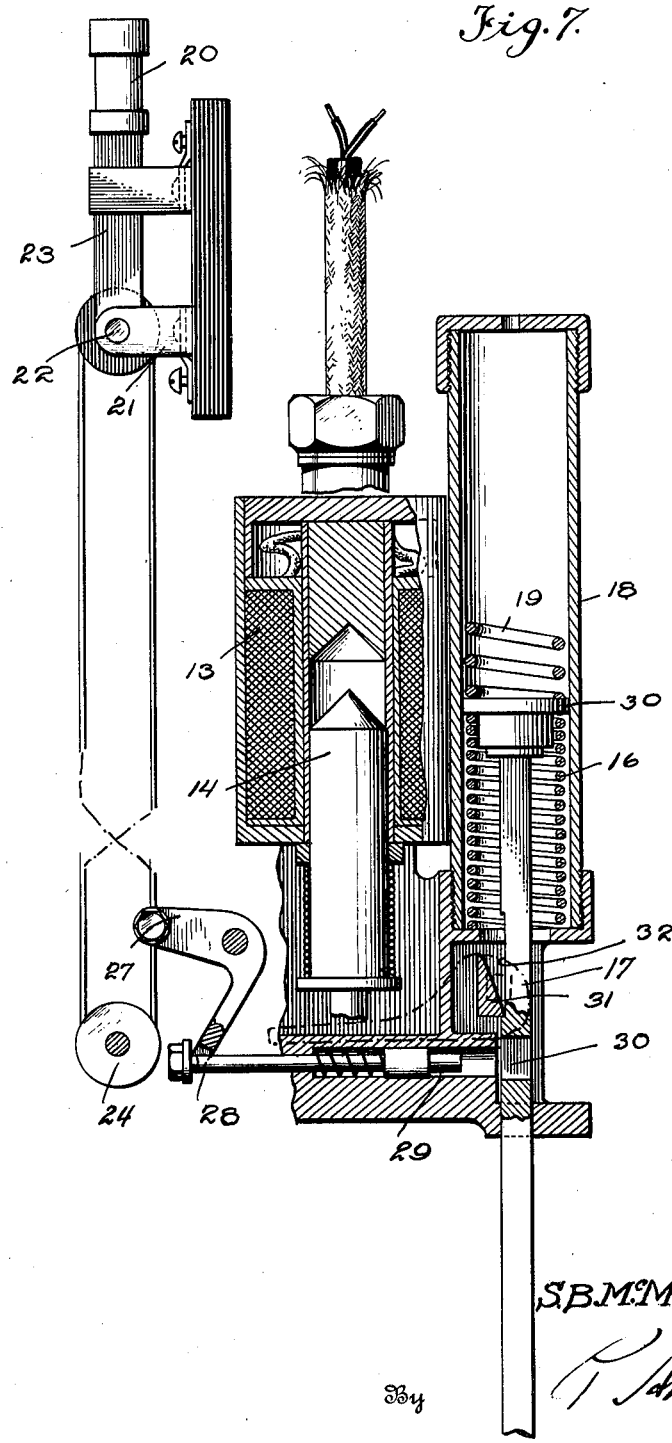

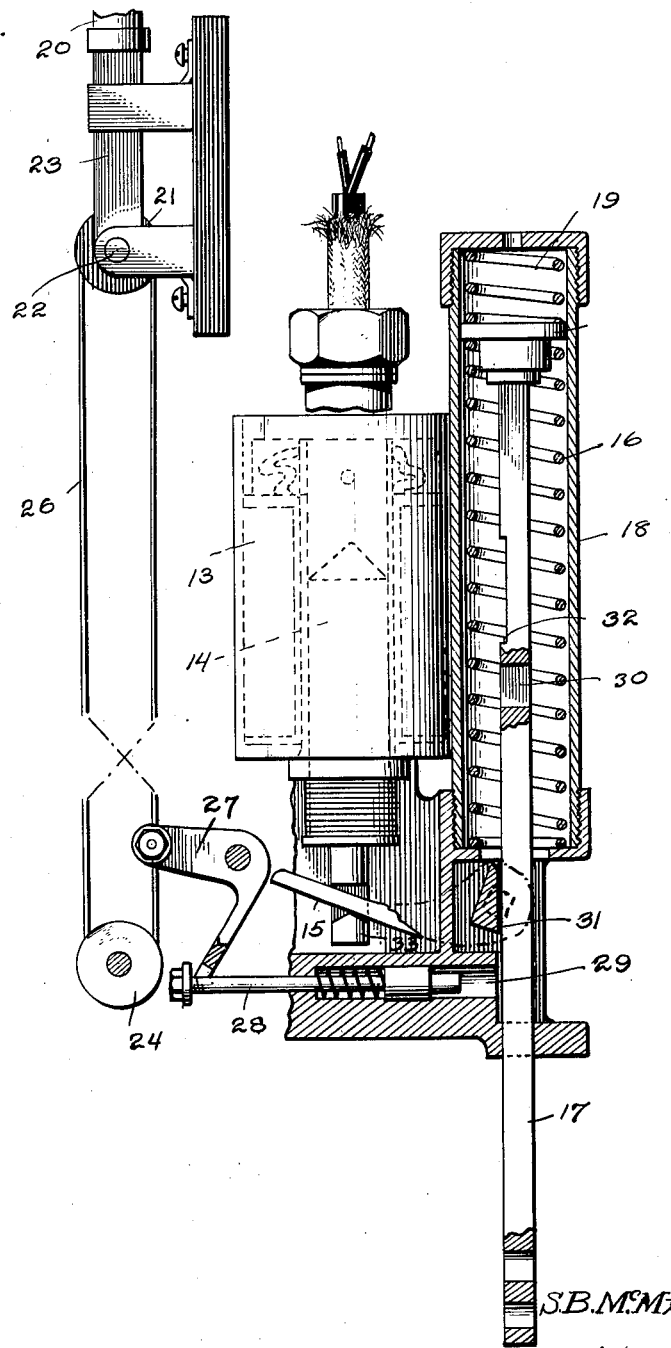

Patented Nov. 24, 1925.

1,562,572

UNITED STATES PATENT OFFICE.

SAMUEL BARTOW McMURRAIN, OF WASHINGTON, DISTRICT OF COLUMBIA.

BOMB OR TORPEDO RELEASE CONTROL MECHANISM FOR AIRPLANES.

Application filed April 24, 1925. Serial No. 25,716.

*To all whom it may concern:*

Be it known that I, SAMUEL BARTOW MCMURRAIN, a citizen of the United States, residing at Washington, District of Columbia, have invented new and useful Improvements in Bomb or Torpedo Release Control Mechanism for Airplanes, of which the following is a specification.

This invention relates to bomb or torpedo control mechanism for airplanes or the like and more particularly to a manually controlled electrically operated device for dropping or releasing bombs or torpedoes at the desired instant from aircraft.

One of the objects of the present invention is to provide a mechanism thereby to increase the efficiency in bombing and torpedo launching.

A further object is to provide a simple and practical mechanism of the above character which may be inexpensively manufactured, assembled and installed on aircraft now in use.

A further object is to provide a mechanism of the above character which may be operated with a minimum amount of effort and with the greatest ease and convenience of the operator without necessitating the removal of his hands from the steering or controlling gear.

Heretofore the releasing has been done by one hand while flying the plane with the other by means of cables or levers exerting a direct force to the releasing latches proper, which often requires sufficient physical effort to cause irregularity in the time of release to result in large errors in bombing. Necessity for instantaneous releasing of the charge, at the instant the sight comes on is apparent since a variation of one second in time of release may cause a range error as great as two hundred feet.

This improved type of launching mechanism for torpedoes and the like is designed for use on any type of aircraft, but is intended for use generally in a single seater plane where the pilot must maneuver the plane while operating the releasing mechanism. This improvement also enables the pilot to grip the control wheel, or stick, with both hands and thereby maintain a positive and steady course upon sighting an object. A force exceeding one hundred pounds would be required to release a charge if a series of direct leverage was relied upon, but with this improved device the pilot is relieved of all physical and manual strain by the incorporation of a switch button located on the control member within convenient reach of a finger or thumb, thereby the switch may be operated without removing either hand from the flying control.

With these objects in mind attention is directed to the accompanying sheets of drawings illustrating one of various possible embodiments of the invention on and wherein similar parts are designated by corresponding reference characters.

In these drawings,—

Figure 1 is a fragmentary side elevation of a plane provided with the bomb or torpedo release mechanism.

Figure 2 is a transverse section on the line 2—2 of Figure 1, through the lower portion of the mechanism.

Figure 3 is an enlarged side elevation of the electric release control, which constitutes a part of the equipment.

Figures 4 and 5 are transverse sections on the lines 4—4 and 5—5 of Figure 3.

Figures 6, 7 and 8 are sections through the electric release control, showing the parts in the several positions of operation.

Figure 9 is a digrammatic arrangement of the mechanism.

To drop a bomb or torpedo the pilot presses the switch button 10 located on the control member 11, closing an electric circuit 12 for operating a solenoid 13 which trips a latch lever 15, permitting a coil spring 16 to retract a pull rod 17 with sufficient force transmitted by cables 34 to release the main latches 36 proper. The latches 36 hold the suspension girdle or cables 37 from beneath the bomb or topedo 40. When the cables 37 are let loose, the charge 40 is free and on its journey of destruction.

To render the release control mechanism inoperative as a precaution of safety a switch and plunger are provided, and will be more clearly understood by referring to the drawings. The switch 20 is located in convenient reach of the pilot, along the side of the fuselage, and preferably above the electric release control member and is of the double pole knife type. The switch is provided with a sheave 21 mounted on a shaft 22 at the lower end, which rotates with the blades as they are open and closed a distance of about 60°. The function of the sheave 21 is to transmit motion through a cable 26 traveling around another sheave 24 located on a bracket secured to the casing of the electric release control. The cable 26 is connected near its lower end to a bell crank lever 27 pivoted on the frame of the release control frame in such a manner that when the switch 20 is closed, so as to render the switch button on the control wheel operative, the bell crank 27 connected by cable 26 causes the safety plunger 28 housed in the frame to the release control to be retracted or disengaged from an aperture 30 in the pull rod 17 thus rendering the rod free movement should it be desired to press the push button 10.

The pull rod 17 is guided by a casing 18 which forms a housing for a power spring 16 located around the pull rod 17 and a bumper spring 19 located above the head of the rod 17. The latch lever 15 has an eccentric lug 31 which engages a recess 32 in the rod 17 to hold the same in the cocked position in readiness to be released by contact of the finger 33 carried by the solenoid core 14.

It is to be understood that in case the mechanism is installed in a tandem fighter it may be sufficient to install other push buttons in the circuit with button 10 and locate same in convenient reach of the observer or gunner or both, or it may be to advantage to locate the safety switch within reach of the gunner or observer, so as to relieve the pilot of the responsibility of operating the release control without departing from the purpose as originally set forth.

When it is desired to re-cock the mechanism for another flight, the rod 17 is to be pulled down by means of a hook or the like inserted in one of the apertures in the lower end of the rod 17 until the members 31 engage the notch 32.

What I claim is:—

1. In an airplane, in combination, releasing mechanism, a steering control member, a switch associated therewith, an electric circuit including a solenoid controlled by said switch, a hook associated with said solenoid, a tripping latch having an eccentric lug actuated by said hook, a pull rod having a notch engaged by said lug whereby said rod is held in cocked position, an actuating spring for said rod and releasing cables connected with said rod adapted to be released when said first mentioned switch is closed.

2. In an airplane, in combination, releasing mechanism, a steering control member, a switch associated therewith, an electric circuit including a solenoid controlled by said switch, a hook associated with said solenoid, a tripping latch having an eccentric lug actuated by said hook, a pull rod having a notch engaged by said lug whereby said rod is held in cocked position, an actuating spring for said rod and releasing cables connected with said rod adapted to be released when said first mentioned switch is closed and an auxiliary switch for rending said first mentioned switch inoperative.

3. In an airplane, in combination, torpedo release control mechanism, a steering member, a switch mounted on said steering member, a solenoid in circuit with said switch and adapted to be actuated when said switch is closed, a spring actuated pull rod normally held in cocked position and adapted to be released on actuation of the solenoid and supporting members for the torpedo adapted to be released by said pull rod.

4. In an airplane, in combination, a torpedo release control mechanism, a steering member, a switch mounted on said steering member, a solenoid in circuit with said switch and adapted to be actuated when said switch is closed, a spring actuated pull rod normally held in cocked position and adapted to be released on actuation of the solenoid, supporting members for the torpedo adapted to be released by said pull rod and a safety device comprising a switch interposed between the first switch and the solenoid adapted to prevent accidental release of the torpedo when in open position.

Signed at Washington, District of Columbia, this 5th day of March, 1925.

SAMUEL B. McMURRAIN.